United States Patent
Saito

(10) Patent No.: US 10,526,499 B2
(45) Date of Patent: Jan. 7, 2020

(54) ACTINIC-RAY-CURABLE INK SET FOR INK-JET RECORDING

(71) Applicant: DIC Corporation, Tokyo (JP)

(72) Inventor: Naohito Saito, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 16/092,303

(22) PCT Filed: Apr. 13, 2017

(86) PCT No.: PCT/JP2017/015104
§ 371 (c)(1),
(2) Date: Oct. 9, 2018

(87) PCT Pub. No.: WO2017/188003
PCT Pub. Date: Nov. 2, 2017

(65) Prior Publication Data
US 2019/0144697 A1    May 16, 2019

(30) Foreign Application Priority Data

Apr. 26, 2016 (JP) ................................. 2016-088014

(51) Int. Cl.
| | | |
|---|---|---|
| *C08F 2/46* | (2006.01) | |
| *C08F 2/50* | (2006.01) | |
| *C08G 61/04* | (2006.01) | |
| *C09D 11/40* | (2014.01) | |
| *C09D 11/324* | (2014.01) | |
| *B41M 5/00* | (2006.01) | |
| *C09D 11/322* | (2014.01) | |
| *C09D 11/38* | (2014.01) | |
| *B41M 7/00* | (2006.01) | |

(52) U.S. Cl.
CPC .............. *C09D 11/40* (2013.01); *B41M 5/00* (2013.01); *C08F 2/46* (2013.01); *C09D 11/322* (2013.01); *C09D 11/324* (2013.01); *C09D 11/38* (2013.01); *B41M 7/0081* (2013.01)

(58) Field of Classification Search
CPC ....... C09D 11/40; C09D 11/38; C09D 11/322; C09D 11/324; B41M 7/0081
USPC ...................... 522/6, 71, 189, 184, 1; 520/1
See application file for complete search history.

(56) References Cited

U.S. PATENT DOCUMENTS

| | | |
|---|---|---|
| 2006/0187285 A1 | 8/2006 | Oyanagi et al. |
| 2008/0098928 A1 | 5/2008 | Oyanagi et al. |
| 2009/0087626 A1 | 4/2009 | Hayata et al. |
| 2014/0160215 A1 | 6/2014 | Saito et al. |
| 2016/0251527 A1 | 9/2016 | Okamoto et al. |

FOREIGN PATENT DOCUMENTS

| | | |
|---|---|---|
| JP | 2006-137183 A | 6/2006 |
| JP | 2008-132758 A | 6/2008 |
| JP | 2009-84313 A | 4/2009 |
| JP | 2009-84419 A | 4/2009 |
| JP | 2009-256447 A | 11/2009 |
| JP | 2012-111848 A | 6/2012 |
| JP | 2015-080921 * | 4/2015 |
| JP | 2015-80921 A | 4/2015 |
| WO | 12/172974 A1 | 12/2012 |

OTHER PUBLICATIONS

Okamoto et al, JP 2015-080921 Machine Translation, Apr. 27, 2015 (Year: 2015).*
International Search Report dated Jun. 6, 2017, issued in counterpart application No. PCT/JP2017/015104. (2 pages).

* cited by examiner

*Primary Examiner* — Jessica Whiteley
(74) *Attorney, Agent, or Firm* — Westerman, Hattori, Daniels & Adrian,

(57) ABSTRACT

To provide an actinic-ray-curable ink set for ink-jet recording which is excellent in thick-film curability even when a UV-LED lamp is used as a light source, and has uniform curing sensitivity across different colors. The present invention relates to an actinic-ray-curable ink set for ink-jet recording, characterized in that a cyan ink contains a phthalocyanine pigment, a radical polymerizable compound, and less than 10% by mass of a photopolymerization initiator based on the total amount of the cyan ink, a magenta ink contains a quinacridone-based pigment, a radical polymerizable compound, and less than 5% by mass of a photopolymerization initiator based on the total amount of the magenta ink, a yellow ink contains an azo pigment, a radical polymerizable compound, and less than 10% by mass of a photopolymerization initiator based on the total amount of the yellow ink, and a black ink contains a carbon black, a radical polymerizable compound, and less than 12% by mass of a photopolymerization initiator based on the total amount of the black ink.

1 Claim, No Drawings

ACTINIC-RAY-CURABLE INK SET FOR INK-JET RECORDING

TECHNICAL FIELD

The present invention relates to an actinic-ray-curable ink set for ink-jet recording which is excellent in thick-film curability even when a light emitting diode lamp is used as a light source and has uniform curing sensitivity across different colors.

BACKGROUND ART

A printing method by an ink-jet printer recording apparatus is a method in which an ink is jetted from a nozzle to allow the ink to adhere to a printing target material. The printing method is a method of printing in a state where the nozzle is not in contact with the printing target material, and in the method, printing can be performed on surfaces having irregular shapes, such as curved surfaces and corrugated surfaces. Thus, the printing method is expected to be applied in a wide variety of industrial fields.

Inks used in ink-jet printer recording apparatuses are roughly divided into solvent system inks, such as aqueous inks and solvent inks and non-solvent system inks, such as actinic-ray-curable inks and solid inks. The non-solvent system inks are more eco-friendly than the solvent system inks which require permeation of a solvent into a printing target material and a solvent evaporation step. Also, the non-solvent system inks quickly become tack-free due to their quick drying properties and are excellent in printability on printing target materials that do not or hardly absorb the solvent. In particular, actinic-ray-curable inks among the non-solvent system inks can form a coating film having high strength, chemical resistance, and toughness in addition to the aforementioned characteristics.

In recent years, light sources used in curing of actinic-ray-curable inks for ink-jet recording have been gradually switching from conventional metal halide lamps, high-pressure mercury-vapor lamps, and the like to low energy light emitting diode lamps (hereinafter abbreviated to "LED lamps").

Among the LED lamps, LED lamps that emit light of wavelengths in the ultraviolet region (hereinafter abbreviated to "UV-LED lamps") generate ultraviolet rays having peak wavelengths in the range of 350 to 420 nm. Thus, when such a UV-LED lamp is used as a light source to cure an ink, the used ink has to contain a photopolymerization initiator whose absorption wavelength is 350 to 420 nm. However, pigments and the photopolymerization initiators contained in such inks generally have a nature of absorbing ultraviolet rays and the like having wavelengths of 350 to 420 nm in many cases. Accordingly, when conventional pigment inks are irradiated with light using a UV-LED light source, the ink sometimes cannot be sufficiently cured.

Known actinic-ray-curable inks for ink-jet recording that are excellent in curability even when a UV-LED lamp is used as a light source include: an ink set containing a yellow ink composition, a magenta ink composition, a cyan ink composition, and black ink composition, characterized in that the ink compositions each contains a radical polymerizable compound (component A), a radical polymerization initiator (component B), and a colorant (component C), the component B contained in each of the ink compositions containing an acylphosphine oxide compound (component B-1) and a thioxanthone compound (component B-2), the ink compositions each containing the component B-1 at 3% by weight or more and less than 17% by weight based on the total amount of the ink composition, the magenta ink composition and the cyan ink composition each containing the component B-2 at 0.1% by weight or more and less than 2% by weight based on the total amount of the ink composition, the yellow ink composition and the black ink composition each containing the component B-2 at 2% by weight or more and less than 6% by weight based on the total amount of the ink composition (see, for example, PTL 1); and an actinic-ray-curable ink composition for ink-jet recording containing an actinic ray polymerizable compound and a photopolymerization initiator, characterized by (1) containing a polymerizable compound having one actinic ray polymerizable group at 60 to 95% by mass based on the total amount of the actinic ray polymerizable compound and a polymerizable compound having two or more actinic ray polymerizable groups at 5 to 40% by mass based on the total amount of the actinic ray polymerizable compound, (2) containing N-vinyl-2-caprolaclam at 1 to 15% by mass and isobornyl acrylate at 1 to 25% by mass based on the total amount of the actinic ray polymerizable compound, as the polymerizable compound having one actinic ray polymerizable group, and (3) containing a polymerizable compound having a vinyl ether group as the polymerizable compound having two or more actinic ray polymerizable groups (see, for example, PTL 2).

However, when the ink or the ink set is used to perform printing into a thickness of approximately 20 µm to 30 µm and curing is tried using the UV-LED lamp, light may be difficult to penetrate to the interior (depths) of the thick ink coating film, resulting in failure of rapid curing of the coating film.

The actinic-ray-curable ink sets for ink-jet recording are generally often used in an aspect where different colored inks are subjected to laminated printing (multicolored printing). In such a case, a coating film formed of a single color ink may have a thickness of about 10 µm to 20 µm, and a coating film formed by the multicolored printing may have a large thickness of about 10 µm to 30 µm in total.

Laminated printing of different colored inks using the ink set to form a coating film having a large thickness has sometimes resulted in non-uniformity in curing degrees of the ink coating film due to difference in curability across the inks.

A large difference in curing rates across different colored inks sometimes leads to a difference in curing rates of dots across the inks, resulting in a significant difference in the dot sizes after curing. Printed matter having a significant difference in the dot sizes may be insufficient in practice in terms of clearness or the like of the printed matter as compared with printed matter having relatively uniform large dots formed therein.

CITATION LIST

Patent Literature

PTL 1: JP-A-2012-111848
PTL 2: WO 12/172974

SUMMARY OF INVENTION

Technical Problem

The problem that the invention is to solve is to provide an actinic-ray-curable ink set for ink-jet recording which can quickly cure throughout the interior of an ink coating film even when a UV-LED lamp is used as a light source and the coating film has a large thickness (which is excellent in thick-film curability), and which can quickly form a cured coating film without causing non-uniformity in curing across different colors even when different colored inks are subjected to laminated printing to form a coating film having a large thickness.

Solution to Problem

The present invention provides an actinic-ray-curable ink set for ink-jet recording, characterized in that a cyan ink contains a phthalocyanine pigment, a radical polymerizable compound, and less than 10% by mass of a photopolymerization initiator based on the total amount of the cyan ink, a magenta ink contains a quinacridone-based pigment, a radical polymerizable compound, and less than 5% by mass of a photopolymerization initiator based on the total amount of the magenta ink, a yellow ink contains an azo pigment, a radical polymerizable compound, and less than 10% by mass of a photopolymerization initiator based on the total amount of the yellow ink, and a black ink contains a carbon black, a radical polymerizable compound, and less than 12% by mass of a photopolymerization initiator based on the total amount of the black ink.

Advantageous Effects of Invention

The actinic-ray-curable ink set for ink-jet recording of the present invention can quickly cure throughout the interior of a ink coating film even when a UV-LED lamp is used as a light source and the coating film has a large thickness (is excellent in thick-film curability), and can quickly form a cured coating film without causing non-uniformity in curing across different colors even when different colored inks are subjected to laminated printing to form a coating film having a large thickness.

DESCRIPTION OF EMBODIMENT

The actinic-ray-curable ink set for ink-jet recording of the present invention contains a cyan ink, a magenta ink, a yellow ink, and a black ink. The ink set may be composed of, for example, one cyan ink, one magenta ink, one yellow ink, and one black ink, or may be composed of two or more inks for each of some or all of the colored inks described above. As specific examples, the ink set of the present invention may be composed of two or more cyan inks, one magenta ink, one yellow ink, and one black ink, or the ink set may contain two or more inks for each of the other inks than the cyan ink.

The actinic-ray-curable ink set for ink-jet recording of the present invention may contain, as needed, inks of other colors, such as a white ink, asides the inks described above.

The actinic-ray-curable ink set for ink-jet recording of the present invention is preferably an ink set for forming color images.

The cyan ink, the magenta ink, the yellow ink, and the black ink constituting the actinic-ray-curable ink set for ink-jet recording of the present invention each contain a colorant, a radical polymerizable compound, and a photopolymerization initiator.

The cyan ink contains a phthalocyanine pigment as the colorant, and contains less than 10% by mass of the photopolymerization initiator based on the total amount of the cyan ink. The magenta ink contains a quinacridone-based pigment as the colorant, and contains less than 5% by mass of the photopolymerization initiator based on the total amount of the magenta ink. The yellow ink contains an azo pigment as the colorant, and contains less than 10% by mass of the photopolymerization initiator based on the total amount of the yellow ink. The black ink contains a carbon black as the colorant, and contains less than 12% by mass of the photopolymerization initiator based on the total amount of the black ink.

It is considered that the thick-film curability of the actinic-ray-curable ink for ink-jet recording can be increased to an extent by increasing the amount of the photopolymerization initiator used. However, since the photopolymerization initiator may have a nature of absorbing actinic rays of wavelengths in 350 to 420 nm as described above, significant increase in the amount of the photopolymerization initiator used leads to absorption of a great part of actinic rays. In particular, when the thickness of the coating film is approximately 10 μm or more, particularly 15 μm or more, actinic rays cannot reach the depths of the coating film, and as a result, the curability of the coating film may deteriorate.

On the other hand, in the actinic-ray-curable ink set for ink-jet recording of the present invention, the amounts of the photopolymerization initiator contained in the cyan ink and the yellow ink are less than 10% by mass, the amount of the photopolymerization initiator contained in the magenta ink is less than 5% by mass, and the amount of the photopolymerization initiator contained in the black ink is less than 12% by mass. Accordingly, a coating film sufficiently cured down to the depths can be obtained even if the thickness of the coating film is as large as 10 μm or more, particularly 15 μm or more. Even when different colored inks are subjected to laminated printing to form a coating film having a large thickness, a cured coating film can be quickly formed without causing non-uniformity in curing due to difference in colors.

Examples of photopolymerization initiators to be used in the present invention include, but not limited to, known radical type photopolymerization initiators.

Specific examples of radical type photopolymerization initiators include acetophenone, acetophenone benzyl ketal, 1-hydroxycyclohyxyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-on, 2-hydroxy-2-methyl-1-phenylpropan-1-on, thioxanthone, diethylthioxanthone, 2-isopropylthioxanthone, 2-chlorothioxanthone, 2-methyl-1-[4-(methylthio)phenyl]-2-morphorino-propan-1-on, bis(2,4,6-trimethylbenzoyl)-phenylphosphine oxide, 2,4,6-trimethylbenzoyl-diphenyl-phosphine oxide, 2,4-diethylthioxanthone, and bis-(2,6-dimethoxybenzoyl)-2,4,4-trimethylpentylphosphine oxide.

Examples of commercially available radical type photopolymerization initiators include IRGACURE 651 (2,2-dimethoxy-1,2-diphenylethan-1-on), IRGACURE 184 (1-hydroxy-cyclohexyl-phenyl-ketone), IRGACURE 1173 (2-hydroxy-2-methyl-1-phenyl-propan-1-on), IRGACURE 2959 (1-[4-(2-hydroxyethoxy)-phenyl]-2-hydroxy-2-methyl-1-propan-1-on), IRGACURE 127 (2-hydroxy-1-{4-[4-(2-hydroxy-2-methyl-propionyl)-benzyl]phenyl}-2-methyl-propan-1-on}, IRGACURE 907 (2-methyl-1-(4-methylthiophenyl)-2-morpholinopropan-1-on),
IRGACURE 369 (2-benzyl-2-dimethylamino-1-(4-morpholinophenyl)-butanone-IRGACURE 379 (2-(dimethylamino)-2-[(4-methylphenyl)methyl]-1-[4-(4-morpholinyl) phenyl]-1-butanone), IRGACURE TPO (2,4,6-trimethylbenzoyl-diphenyl-phosphine oxide), IRGACURE 819 (bis(2,4,6-trimethylbenzoyl)-phenylphosphine oxide), IRGACURE 784 (bis(η5-2,4-cyclopentadien-1-yl)-bis(2,6-difluoro-3-(1H-pyrrol-1-yl)-phenyl)titanium), IRGACURE OXE 01 (1.2-octanedione, 1-[4-(phenylthio)-, 2-(O-benzoyloxime]), IRGACURE OXE 02 (ethanone, 1-[9-ethyl-6-(2-methylbenzoyl)-9H-carbazol-3-yl]-, 1-(O-acetyloxime)), IRGACURE 754 (a mixture of oxyphenylacetic acid 2-[2-oxo-2-phenylacetoxyethoxy]ethyl ester and oxyphenylacetic acid 2-(2-hydroxyethoxy)ethyl ester), IRGACURE TPO, LR8893, and LR8970 (all from BASF Japan), DETX-S (2,4-diethylthioxanthone) (from Nippon Kayaku Co. Ltd.), and EBECRYL P36 (from UCB).

Among them, acylphosphine oxide-based photopolymerization initiators are preferably used as the photopolymerization initiator. Preferred examples of acylphosphine oxide-based photopolymerization initiators include, but not limited to, bis(2,4,6-trimethylbenzoyl)-phenylphosphine oxide (example: IRGACURE 819), 2,4,6-trimethylbenzoyl-diphenyl-phosphine oxide (example: IRGACURE TPO), and IRGACURE 1870. Combination use of bis(2,4,6-trimethylbenzoyl)-phenylphosphine oxide (example: IRGACURE 819) and 2,4,6-trimethylbenzoyl-diphenyl-phosphine oxide (example: IRGACURE TPO) is preferred in that a coating film sufficiently cured down to the depths can be obtained even if the coating film has a large thickness.

Regarding the mass ratio and the use amount in the combination use of bis(2,4,6-trimethylbenzoyl)-phenyl-phosphine oxide (IRGACURE 819) and 2,4,6-trimethylbenzoyl-diphenyl-phosphine oxide (IRGACURE TPO), for example, in the case of the cyan ink, an acylphosphine oxide-based photopolymerization initiator that has a mass ratio of bis(2,4,6-trimethylbenzoyl)-phenylphosphine oxide to 2,4,6-trimethylbenzoyl-diphenyl-phosphine oxide of 0.1 to 0.4 is preferably contained at less than 10% by mass based on the total amount of the cyan ink, and in terms of increasing the balance between the quick curing properties in the depths of coating films and the curability at the surfaces of coating films, more preferably contained in the range of 3 to 8% by mass.

In the magenta ink, an acylphosphine oxide-based photopolymerization initiator that has a mass ratio of bis(2,4,6-trimethylbenzoyl)-phenylphosphine oxide to 2,4,6-trimethylbenzoyl-diphenyl-phosphine oxide of 0.4 to 0.8 is preferably contained at less than 5% by mass based on the total amount of the magenta ink, and in terms of increasing the balance between the quick curing properties in the depths of coating films and the curability at the surfaces of coating films, more preferably contained in the range of 1 to 4% by mass.

In the yellow ink, an acylphosphine oxide-based photopolymerization initiator that has a mass ratio of bis(2,4,6-trimethylbenzoyl)-phenylphosphine oxide to 2,4,6-trimethylbenzoyl-diphenyl-phosphine oxide of 0.1 to 0.4 is preferably contained at less than 10% by mass based on the total amount of the yellow ink, and in terms of increasing the balance between the quick curing properties in the depths of coating films and the curability at the surfaces of coating films, more preferably contained in the range of 3 to 8% by mass.

In the black ink, an acylphosphine oxide-based photopolymerization initiator that has a mass ratio of bis(2,4,6-trimethylbenzoyl)-phenylphosphine oxide to 2,4,6-trimethylbenzoyl-diphenyl-phosphine oxide of 0.1 to 0.4 is preferably contained at less than 12% by mass based on the total amount of the black ink, and in terms of increasing the balance between the quick curing properties in the depths of coating films and the curability at the surfaces of coating films, more preferably contained in the range of 5 to 10% by mass.

The use of the combination the respective color inks that contain the acylphosphine oxide-based photopolymerization initiators having the respective mass ratios as described above can provide a coating film sufficiently cured down to the depths thereof even when the coating film has a large thickness, and allows for quick formation of a cured coating film without causing non-uniformity in curing due to difference in colors even when different colored inks are subjected to laminated printing to form a coating film having a large thickness.

As the photopolymerization initiator, asides the acylphosphine oxide-based photopolymerization initiator, other photopolymerization initiators can be used in combination wherewith as needed.

As other photopolymerization initiators, for example, thioxanthone-based photopolymerization initiators, such as thioxanthone, diethylthioxanthone, 2-isopropylthioxanthone, 2-chlorothioxanthone, and 2,4-diethylthioxanthone are preferably used in terms of increasing curability at the surfaces of coating films.

Thus, in terms of obtaining an ink that can achieve both of good curability at the surfaces of ink coating films and good curability in the depths of coating films having large thicknesses, the thioxanthone-based photopolymerization initiator is preferably used at less than 2.5% by mass based on the total amount of the photopolymerization initiator, and more preferably used in the range of 0.5% by mass or more and less than 2.5% by mass.

Examples of phthalocyanine pigments for use in the cyan ink include CI pigment blues 1, 2, 3, 15:3, 15:4, 16:6, 16, 17:1, 75, and 79.

Examples of quinacridone-based pigments for use in the magenta ink include CI pigment red 122, CI pigment red 202, CI pigment red 209, and CI pigment violet 19.

Examples of azo pigments for use in the yellow ink include monoazo and disazo pigments, such as CI pigment yellows 120, 151, 154, 175, 180, 181, 1, 65, 73, 74, 116, 12, 13, 17, 81, 83, 150, 155, 214, and 128.

Examples of carbon blacks for use in the black ink include No. 2300, No. 900, MCF88, No. 33, No. 40, No. 45, No. 52, MA7, MA8, MA100, and No. 2200B from Mitsubishi Chemical Corporation; Ravens 5750, 5250, 5000, 3500, 1255, and 700 from Columbia Chemical; Regals 400R, 330R, and 660R, Moguls L and 700, Monarchs 800, 880, 900, 1000, 1100, 1300, and 1400 from Cabot Corporation; and Color Blacks FW1, FW2, FW2V, FW18, and FW200, Color Blacks S150, S160, and S170, Printexes 35, U, V, and 140U, and Special Blacks 6, 5, 4A, and 4 from Degussa.

The mean particle sizes of the pigments are preferably approximately in the range of 10 to 300 nm, and more preferably approximately from 50 to 200 nm.

For obtaining sufficient image density and light resistance of printed images, the pigments are preferably contained in the range of 1 to 20% by mass based on the total amount of each ink, more preferably contained in the range of 1 to 10% by mass, and most preferably contained in the range of 1 to 5% by mass. The pigment concentration in the magenta ink is preferably higher than in the other color inks. Specifically, the pigment concentration is preferably 1.2 or more times, and more preferably 1.2 to 4 times higher than that of the other color inks.

As a white pigment in a white ink, known inorganic white pigments can be used without any limitation. Examples of inorganic white pigments include sulfate salts or carbonate salts of alkaline earth metals, silicas, such as silicic acid fine powders and synthetic silicate salts, calcium silicate, alumina, hydrated alumina, titanium oxide, zinc oxide, talc, and clay. As the inorganic white pigment, the silicas whose surfaces are surface-treated by various surface treatment methods may also be used.

Among them, a surface-treated titanium oxide is preferably used as the inorganic white pigment since relatively good dispersibility is exhibited. The titanium oxide is preferably subjected to a surface treatment with an inorganic substance, for example, for avoiding a photocatalytic influence, and is preferably subjected to a surface treatment with silica and alumina. As the inorganic white pigment, a titanium oxide that is subjected to a surface treatment with silica and alumina and then subjected to a surface treatment with a silane coupling agent is preferably used.

The mean particle size of the titanium oxide used is preferably 100 to 500 nm, and in terms of obtaining an ink having better discharge stability and good color developing properties in printed images, more preferably 150 nm to 400 nm.

The ink set may contain, in addition to the basic four colors of the yellow ink, the magenta ink, the cyan ink, and the black ink, a deep color or a pale color of the same chromatic series as each color. Examples of such cases include a case of containing a light magenta as a pale color and a red as a deep color in addition to a magenta, a case of containing a light cyan as a pale color and a blue as a deep color in addition to a cyan, and a case of containing a gray or a light black as a pale color and a mat black as a deep color in addition to a black.

For the pigments, pigment dispersants or pigment derivatives (synergists) may be used for the purpose of increasing dispersion stability in the actinic ray polymerizable compound described later. Specific examples of pigment dispersants include, but not limited to, AJISPERs PB821, PB822, and PB817 from Ajinomoto Fine-Techno Co., Inc., Solsperses 24000GR, 32000, 33000, and 39000 from Avecia, DISPARONs DA-703-50, DA-705, and DA-725 from Kusumoto Chemicals Ltd. The amount of a pigment dispersant used is preferably in the range of 10 to 100% by mass based on the pigment, and in terms of obtaining an ink having better discharge stability and pigment dispersibility, more preferably in the range of 20 to 60% by mass. Examples of pigment derivatives include sulfonic acid derivatives of pigments.

As a radical polymerizable compound for use in the present invention, any known monofunctional monomers and polyfunctional monomers may be used without any limitation.

Examples of monofunctional monomers include methyl (meth)acrylate, ethyl(meth)acrylate, propyl(meth)acrylate, butyl (meth)acrylate, amyl (meth)acrylate, 2-ethylhexyl (meth)acrylate, isooctyl (meth)acrylate, nonyl (meth)acrylate, isodecyl (meth)acrylate, dodecyl (meth)acrylate, hexadecyl(meth)acrylate, octadecyl (meth)acrylate, cyclohexyl (meth)acrylate, benzyl (meth)acrylate, methoxyethyl(meth) acrylate, butoxyethyl (meth)acrylate, phenoxyethyl(meth) acrylate, nonylphenoxyethyl(meth)acrylate, glycidyl(meth) acrylate, dimethylaminoethyl(meth)acrylate, diethylaminoethyl (meth)acrylate, isobornyl(meth)acrylate, tetrahydrofurfuryl (meth)acrylate, dicyclopentanyl(meth) acrylate, dicyclopentenyl(meth)acrylate, dicyclopentenyloxyethyl (meth)acrylate, and other (meth)acrylates having a substituent, vinylpyrrolidone, N-vinylformamide, N-vinyl-2-caprolactam, (meth)acrylate having a mercapto group, vinylpyrrolidone, and N-vinylformamide.

Examples of polyfunctional monomers include 1,3-butylene glycol di(meth)acrylate, 1,4-butanediol di(meth)acrylate, 1,5-pentanediol di(meth)acrylate, 3-methyl-1,5-pentanediol di(meth)acrylate, 1,6-hexanediol di(meth)acrylate, neopentylglycol di(meth)acrylate, 1,8-octanediol di(meth) acrylate, 1,9-nonanediol di (meth)acrylate, tricyclodecane dimethanol di(meth)acrylate, ethylene glycol di(meth)acrylate, polyethylene glycol di(meth)acrylate, propylene glycol di(meth)acrylate, dipropylene glycol di(meth)acrylate, tripropylene glycol di(meth)acrylate, di(meth)acrylates of polypropylene glycol and the like, tris(2-hydroxyethyl)isocyanurate di(meth)acrylate, neopentylglycol di(meth)acrylate, bisphenol A di(meth)acrylate, bisphenol F di(meth) acrylate, hydrogenated bisphenol A di(meth)acrylate, trimethylolpropane tri(meth)acrylate, pentaerythritol tri (meth)acrylate, dipentaerythritol poly(meth)acrylate, and ethylene oxide-, propylene oxide-, and other alkylene oxide-modification products thereof, and caprolactone modification products thereof, ethylene oxide-modified phosphoric acid (meth)acrylate, ethylene oxide-modified alkylphosphoric acid (meth)acrylate, and the like, 2-(2-vinyloxyethoxy)ethyl (meth)acrylate, ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, trimethylolpropane trivinyl ether, and other di- or trivinyl ether compounds, urethane (meth)acrylate, epoxy (meth)acrylate, polyester (meth)acrylate, and other polymerizable compounds. The monomers may be used in combination of two or more thereof.

In the polymerizable compound, a monofunctional monomer and a polyfunctional monomer are preferably used in combination in the case of placing importance on adhesiveness to printing target materials and chemical resistance and strength of coating films, and the monofunctional monomer is preferably used at 60 to 99% by mass based on the total amount of the radical polymerizable compound and the polyfunctional monomer is preferably used at 1 to 40% by mass based on the total amount of the radical polymerizable compound. In particular, the polyfunctional monomer is preferably used at 5 to less than 15% by mass based on the total amount of the radical polymerizable compound in terms of obtaining an ink having both of better adhesiveness to printing target materials and chemical resistance and strength of coating films.

On the other hand, in the polymerizable compound, when formation of coating films having further better strength, hardness, and solvent resistance is required, it is preferred that the monofunctional monomer is used at 5 to 25% by mass based on the total amount of the radical polymerizable compound and the polyfunctional monomer is used at 75 to 95% by mass based on the total amount of the radical polymerizable compound.

N-Vinyl-2-caprolactam, tetrahydrofurfuryl (meth)acrylate, isobornyl (meth)acrylate, or the like is preferably used as the monofunctional monomer. In terms of further increasing adhesiveness particularly to plastic materials among the printing target materials described later, N-vinyl-2-caprolactam and tetrahydrofurfuryl(meth)acrylate are preferably used in the range of 20% by mass to 70% by mass in total based on the total amount of the radical polymerizable compound, and more preferably in the range of 30 to 60% by mass. In terms of further improving long-term stability of the ink, N-vinyl-2-caprolactam is preferably used in the range of 1% by mass to 15% by mass based on the total amount of the radical polymerizable compound, and more preferably in the range of 5 to 15% which range provides superior adhesiveness.

On the other hand, in terms of obtaining an ink that can form a printed coating film superior in resistance to chemicals, such as alcohol, isobornyl (meth)acrylate is preferably used as the monofunctional monomer. The isobornyl (meth)acrylate is preferably used in the range of 1% by mass to 25% by mass based on the total amount of the radical polymerizable compound.

As the polyfunctional monomer, ethylene oxide-, propylene oxide-, or other alkylene oxide-modified polyfunctional monomers are preferably used, and in terms of obtaining higher wear resistance, ethylene oxide-modified bisphenol A di(meth)acrylate is more preferably used. The molar number of added ethylene oxide structures in the ethylene oxide-modified bisphenol A di(meth)acrylate is preferably 4 moles or less in terms of improving curability at the surfaces of coating films.

Depending on the ink jet apparatus used, the radical polymerizable compound is preferably designed so that the viscosity after monomers are blended is approximately 1 to 100 mPa·sec, and in printing by a ink jet recording method, the viscosity is preferably in the range of 5 to 25 mPa·s.

On the other hand, an ink containing a reactive oligomer may be used as an ink constituting the ink set of the present invention in terms of forming printed coating films having excellent performances, such as flexibility, hardness, toughness, and adhesiveness.

The reactive oligomer is preferably used at not more than 20% by mass based on the total amount of the radical polymerizable compound in terms of forming printed coating films having excellent flexibility, hardness, toughness, adhesiveness, and the like without impairing good discharge properties and curability of the ink.

Examples of reactive oligomers include urethane (meth)acrylate oligomers, epoxy (meth)acrylate oligomers, and polyester (meth)acrylate oligomers, and two or more thereof may be used in combination.

In each ink used in the present invention, for increasing storage stability of the ink, a polymerization inhibitor, such as hydroquinone, methoquinone, di-t-butylhydroquinone, P-methoxyphenol, butylhydroxytoluene, and a nitrosoamine salt may be used in the range of 0.01 to 2% by mass of the ink.

As a sensitizer, an amine that does not undergo addition reaction with the radical polymerizable compound, such as trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, or 4,4'-bis(diethylamino)benzophenone, may also be used together.

In each ink used in the present invention, a non-reactive resin, such as an acrylic resin, an epoxy resin, a terpene phenol resin, or a rosin ester, or the like may be blended to the extent that the effects of the present invention are not impaired, for the purpose of imparting adhesion to printing target materials.

Each ink used in the present invention may be prepared by dispersing a pigment in a mixture of the pigment and a radical polymerizable compound optionally having a pigment dispersant and a resin further added therein using an ordinary disperser such as a bead mill, then adding a photopolymerization initiator, further adding additives, such as a surface tension modifier, as needed, and stirring the mixture to dissolve the components.

The ink may also be prepared by producing a high concentration pigment dispersion (mill base) using an ordinary disperser, such as a bead mill, in advance, and then mixing a radical polymerizable compound having a photopolymerization initiator dissolved therein, an additive, and the like with stirring.

As a stirring and dispersing apparatus for dispersing a pigment, asides a bead mill, known common dispersers, such as an ultrasonic homogenizer, a high pressure homogenizer, a paint shaker, a ball mill, a roll mill, a sand mill, a sand grinder, a dyno mill, a dispermat, an SC mill, and a nanomizer, may be used.

The actinic-ray-curable ink set for ink-jet recording of the present invention undergoes a curing reaction by being irradiated with light, such as an actinic ray, preferably an ultraviolet ray. As a light source of an ultraviolet ray or the like, light sources generally used for an actinic-ray-curable ink for ink-jet recording, for example, a metal halide lamp, a xenon lamp, a carbon arc light, a chemical lamp, a low pressure mercury lamp, a high pressure mercury lamp, and a UV-LED lamp, can be used to cure inks with no problem.

The actinic-ray-curable ink set for ink-jet recording of the present invention is highly sensitive, and thus can be cured by using UV-LED light or an ultraviolet ray emitting semiconductor element, such as an ultraviolet ray emitting semiconductor laser. Specifically, an image can be formed by discharging the inks on a printing target material to print an image, and irradiating the image with an actinic ray having a wavelength peak in the range of 350 to 420 nm using a UV-LED lamp to cure the image.

As an ink jet recording method, any conventionally known method can be used. Examples thereof include a method of discharging a droplet using vibration of a piezoelectric element (a recording method using an ink jet head in which an ink droplet is formed by mechanical deformation of an electrostrictive element) and a method using thermal energy.

The actinic-ray-curable ink set for ink-jet recording of the present invention is excellent in adhesion to printing target materials, and thus can be easily printed even on surfaces of printing target materials having curved or corrugated irregular shapes.

As the printing target material, for example, plastic materials can be used. Specific examples of plastic materials as the printing target material include ABS-based polymer alloys, such as ABS (acrylonitrile-butadiene-styrene) resins, PVC (polyvinyl chloride)/ABS resins, PA (polyamide)/ABS resins, PC (polycarbonate)/ABS resins, and PBT (polybutylene terephthalate)/ABS, AAS (acrylonitrile-acrylic rubber-styrene) resins, AS (acrylonitrile-styrene) resins, AES (acrylonitrile-ethylene rubber-styrene) resins, MS ((meth)acrylate ester-styrene)-based resins, PC (polycarbonate)-based resins, acrylic resins, methacrylic resins, and PP (polypropylene)-based resins which are used for general purpose plastics for injection molding.

As the plastic material, for example, thermoplastic resin films for use in package materials may be used.

Examples of thermoplastic resin films include those generally used for food packaging film, for example, polyethylene terephthalate (PET) films, polystyrene films, polyamide films, polyacrylonitrile films, polyolefin films, such as polyethylene films (LLDPE: low density polyethylene films, HDPE: high density polyethylene films) and polypropylene films (CPP: cast polypropylene films, and OPP: biaxially-oriented polypropylene films), polyvinylalcohol films, and ethylene-vinylalcohol copolymer films. As the thermoplastic resin films, those subjected to an orientation treatment, such as uniaxial orientation and biaxial orientation, and those in which a surface is subjected to a flame treatment, a corona discharge treatment, or the like may be used.

EXAMPLES

The present invention will be described in detail below with reference to examples.

Preparation Example of High Concentration Pigment Dispersion

Preparation Example of Cyan Pigment Dispersion (1)

10 parts by mass of FASTOGEN BLUE TGR-G (phthalocyanine pigment CI pigment blue 15:4 from DIC Corporation), 4.5 parts by mass of Solsperse 32000 (polymer pigment dispersant from Lubrizol), and 85.5 parts by mass of LIGHT ACRYLATE PO-A (phenoxyethyl acrylate from Kyoeisha Chemical Co., Ltd.) were mixed with stirring by a stirrer for 1 hour, and then the mixture was treated by a bead mill for 2 hours to prepare a cyan pigment dispersion (1).

Preparation Example of Magenta Pigment Dispersion (2)

10 parts by mass of FASTOGEN SUPER MAGENTA RTS (magenta pigment CI pigment red 122 from DIC Corporation), 4.5 parts by mass of Solsperse 32000 (polymer pigment dispersant from Lubrizol), and 85.5 parts by mass of LIGHT ACRYLATE PO-A (phenoxyethyl acrylate form Kyoeisha Chemical Co., Ltd.) were mixed with stirring by a stirrer for 1 hour, and then the mixture was treated by a bead mill for 2 hours to prepare a magenta pigment dispersion (2).

Preparation Example of Yellow Pigment Dispersion (3)

10 parts by mass of LEVASCREEN YELLOW GO1 (CI pigment yellow 150 from LANXESS), 6 parts by mass of Solsperse 32000 (polymer pigment dispersant from Lubrizol Japan), and 84 parts by mass of LIGHT ACRYLATE PO-A (phenoxyethyl acrylate from Kyoeisha Chemical Co., Ltd.) were mixed with stirring by a stirrer for 1 hour and then the mixture was treated by a beads mill for 2 hours to prepare a yellow pigment dispersion (3).

Preparation Example of Black Pigment Dispersion (4)

10 parts by mass of carbon black #960 (carbon black from Mitsubishi Chemical Corporation), 4.5 parts by mass of Solsperse 32000 (polymer pigment dispersant from Lubrizol), and 85.5 parts by mass of LIGHT ACRYLATE PO-A (phenoxyethyl acrylate from Kyoeisha Chemical Co., Ltd.) were mixed with stirring by a stirrer for 1 hour, and then the mixture was treated by a beads mill for 2 hours to prepare a black pigment dispersion (4).

Preparation Example of Inks

Actinic-ray-curable inks for ink-jet recording were produced according to compositions shown in Tables 1 and 2. Specifically, MIRAMER M3130, MIRAMER M240, IBXA, V-CAP, LIGHT ACRYLATE POA, and KF-54 were put into a container and mixed with stirring, and then Irgacure 819, Irgacure TPO, and DETX were added and the mixture was mixed and dissolved with heat at 60° C. for 30 minutes. After dissolution of powder compounds was confirmed, each of the pigment dispersions prepared in the preparation examples of high concentration pigment dispersions described above was added and the mixture was mixed with stirring for 10 minutes to produce cyan inks (C1 to C3), magenta inks (M1 to M4), yellow inks (Y1 to Y3), and black inks (K1 to K3).

The abbreviations in Tables 1 and 2 represent the following compounds.

M3130: ethylene oxide (EO)-modified trimethylolpropane triacrylate from MIWON

M240: ethylene oxide (EO)-modified bisphenol A diacrylate from MIWON

IBXA: isobornyl acrylate from Osaka Organic Chemical Industry Ltd.

V-CAP: N-vinyl-2-caprolactam from ISP

POA: phenoxyethyl acrylate from Kyoeisha Chemical Co., Ltd.

KF-54: polysiloxane from Shin-Etsu Chemical Co., Ltd.

Irgacure 819: bis(2,4,6-trimethylbenzoyl)-phenylphosphine oxide from BASF

Irgacure TPO: 2,4,6-trimethylbenzoyl-diphenyl-phosphine oxide from BASF

DETX-S: diethylthioxanthone from Nippon Kayaku Co. Ltd.

[Irgacure 819/Irgacure TPO]: weight ratio of bis(2,4,6-trimethylbenzoyl)-phenylphosphine oxide to 2,4,6-trimethylbenzoyl-diphenyl-phosphine oxide

[Surface Curability]

The actinic-ray-curable inks for ink-jet recording produced in the preparation examples of inks were each applied on a polycarbonate plate (LEXAN, thickness: 1 mm from AGC Inc.) using a spin coater into a thickness of 10 μm, and then was irradiated with light using an LED irradiation device equipped with a stage moving unit (emission wavelength: 385 nm, peak intensity: 500 mW/cm$^2$) manufactured by Hamamatsu Photonics K. K. so that one irradiation energy was 30 J/m$^2$, and the integrated value of the quantity of the irradiation energy until tack-free was achieved was determined.

[Balance of Surface Curability across Different Ink Colors]

The integrated values of the quantity of the irradiation energy for inks which are calculated in the method described in the evaluation method in [Surface Curability] were compared in each of the ink sets having the compositions shown in Table 3 to 7. An ink set in which the inks of four colors had the same integrated value (30 mJ/cm$^2$×number of irradiations) of the quantity of the irradiation energy was evaluated as "o", and an ink set in which one or more color inks among the four color inks had a different integrated value (30 mJ/cm$^2$×number of irradiations) of the quantity of the irradiation energy was evaluated as "x".

[Thick-Film Curability]

The actinic-ray-curable inks for ink-jet recording prepared in the preparation examples of inks were each applied on a polycarbonate plate (LEXAN, thickness: 1 mm form AGC Inc.) using a spin coater into a thickness of 10 μm and a thickness of 15 μm, and then were irradiated with light using an LED irradiation device equipped with a stage moving unit (light emitting wavelength: 385 nm, peak intensity: 500 mW/cm$^2$) manufactured by Hamamatsu Photonics K. K. until tack-free was achieved. Cuts of 10×10=100 squares were made in the resulting cured coating film with a cutter knife, a piece of cellophane tape from NICHIBAN CO. LTD. was adhered, and was rubbed 10 times with a nail. The tape was peeled vigorously at a rate of about 1 cm/sec, and the number of remaining squares of the coating film was checked. A coating film in which a large number of squares remained on the surface of the polycarbonate plate, which is considered to have excellent adhesiveness, was evaluated as a coating film that sufficiently cured down to the depths of the coating film having a large thickness.

Evaluation Criteria o: Number of squares of coating film remaining on polycarbonate plate surface is 80 or more.

Δ: Number of squares of coating film remaining on polycarbonate plate surface is 50 to 79.

x: Number of squares of coating film remaining on polycarbonate plate surface is less than 50.

TABLE 1

|  |  | Cyan ink | | | Magenta ink | | | |
| --- | --- | --- | --- | --- | --- | --- | --- | --- |
|  |  | C-1 | C-2 | C-3 | M-1 | M-2 | M-3 | M-4 |
| Pigment dispersion (parts by mass) |  | (1) 20.0 | (1) 20.0 | (1) 20.0 | (2) 40.0 | (2) 40.0 | (2) 40.0 | (2) 40.0 |
| M3130 (parts by mass) |  | 4.5 | 4.5 | 4.5 | 4.5 | 4.5 | 4.5 | 4.5 |
| M240 (parts by mass) |  | 4.0 | 4.0 | 4.0 | 4.0 | 4.0 | 4.0 | 4.0 |
| IBXA (parts by mass) |  | 12.0 | 12.0 | 12.0 | 12.0 | 12.0 | 12.0 | 12.0 |
| V-CAP (parts by mass) |  | 12.0 | 12.0 | 12.0 | 12.0 | 12.0 | 12.0 | 12.0 |
| POA (parts by mass) |  | 39.8 | 39.8 | 36.8 | 23.5 | 23.3 | 23.3 | 20.3 |
| KF-54 (parts by mass) |  | 0.2 | 0.2 | 0.2 | 0.2 | 0.2 | 0.2 | 0.2 |
| Irgacure 819 (parts by mass) |  | 1.5 | 2.0 | 2.0 | 1.0 | 1.5 | 0.8 | 2.0 |
| Irgacure TPO (parts by mass) |  | 5.0 | 4.5 | 7.0 | 1.8 | 1.5 | 2.2 | 4.0 |
| DETX (parts by mass) |  | 1.0 | 1.0 | 1.5 | 1.0 | 1.0 | 1.0 | 1.0 |
| Photopolymerization initiator (parts by mass) |  | 7.5 | 7.5 | 10.5 | 3.8 | 4.0 | 4.0 | 7.0 |
| Irgacure 819/Irgacure TPO (mass ratio) |  | 0.30 | 0.44 | 0.29 | 0.56 | 1.00 | 0.36 | 0.50 |
| Surface curability mJ/cm² |  | 120 | 120 | 90 | 120 | 120 | 120 | 90 |
| Thick-film curability | Thickness 10 μm | o | o | Δ | o | o | o | Δ |
|  | Thickness 15 μm | o | Δ | x | o | Δ | Δ | x |

TABLE 2

|  |  | Yellow ink | | | Black ink | | |
| --- | --- | --- | --- | --- | --- | --- | --- |
|  |  | Y-1 | Y-2 | Y-3 | K-1 | K-2 | K-3 |
| Pigment dispersion (parts by mass) |  | (3) 30.0 | (3) 30.0 | (3) 30.0 | (4) 20.0 | (4) 20.0 | (4) 20.0 |
| M3130 (parts by mass) |  | 4.5 | 4.5 | 4.5 | 4.5 | 4.5 | 4.5 |
| M240 (parts by mass) |  | 4.0 | 4.0 | 4.0 | 4.0 | 4.0 | 4.0 |
| IBXA (parts by mass) |  | 12.0 | 12.0 | 12.0 | 12.0 | 12.0 | 12.0 |
| V-CAP (parts by mass) |  | 12.0 | 12.0 | 12.0 | 12.0 | 12.0 | 12.0 |
| POA (parts by mass) |  | 28.3 | 28.3 | 26.3 | 36.2 | 36.2 | 34.3 |
| KF-54 (parts by mass) |  | 0.2 | 0.2 | 0.2 | 0.2 | 0.2 | 0.2 |
| Irgacure 819 (parts by mass) |  | 1.8 | 2.5 | 2.0 | 1.9 | 3.0 | 2.5 |
| Irgacure TPO (parts by mass) |  | 5.4 | 4.7 | 7.0 | 7.0 | 5.9 | 8.0 |
| DETX (parts by mass) |  | 1.8 | 1.8 | 2.0 | 2.2 | 2.2 | 2.5 |
| Photopolymerization initiator (parts by mass) |  | 9.0 | 9.0 | 11.0 | 11.1 | 11.1 | 13.0 |
| Irgacure 819/Irgacure TPO (mass ratio) |  | 0.33 | 0.53 | 0.29 | 0.27 | 0.51 | 0.31 |
| Surface curability mJ/cm² |  | 120 | 120 | 90 | 120 | 120 | 90 |
| Thick-film curability | Thickness 10 μm | o | o | Δ | o | o | Δ |
|  | Thickness 15 μm | o | Δ | x | o | Δ | x |

Example 1

An ink set in which the amount of a photopolymerization initiator was less than 10% by mass for a cyan ink and a yellow ink, and less than 5% by mass for a magenta ink, and less than 12% by mass for a black ink, and the Irgacure 819/Irgacure TPO ratio was 0.1 to 0.4 for the cyan ink, the yellow ink, and the black ink, and 0.4 to 0.8 for the magenta ink had a good balance in curability across different colored inks, and was superior in thick-film curability. Table 3 shows the results.

TABLE 3

|  |  | Example 1 | | |
|---|---|---|---|---|
|  | C-1 | M-1 | Y-1 | K-1 |
| Photopolymerization initiator (parts by mass) | 7.5 | 3.8 | 9.0 | 11.1 |
| Irgacure 819/Irgacure TPO (mass ratio) | 0.30 | 0.56 | 0.33 | 0.27 |
| Surface curability mJ/cm$^2$ | 120 | 120 | 120 | 120 |
| Balance of surface curability across different colored inks | | ○ | | |
| Thick-film curability  Thickness 10 μm | ○ | ○ | ○ | ○ |
| Thickness 15 μm | ○ | ○ | ○ | ○ |

Example 2

An ink set in which the amount of a photopolymerization initiator used was less than 10% by mass for a cyan ink and a yellow ink, less than 5% by mass for a magenta ink, less than 12% by mass for a black ink, and the Irgacure 819/Irgacure TPO ratio exceeded 0.4 for the cyan ink, the yellow ink, and the black ink, and exceeded 0.8 for the magenta ink showed a little reduction in thick-film curability, but had a good balance in curability across different colored inks, and was superior in thick-film curability. Table 4 shows the results.

TABLE 4

|  | Example 2 | | | |
|---|---|---|---|---|
|  | C-2 | M-2 | Y-2 | K-2 |
| Photopolymerization initiator (parts by mass) | 7.5 | 4.0 | 9.0 | 11.1 |
| Irgacure 819/Irgacure TPO (mass ratio) | 0.44 | 1.00 | 0.53 | 0.51 |
| Surface curability mJ/cm$^2$ | 120 | 120 | 120 | 120 |
| Blance in surface curability across different colored inks | | ○ | | |
| Thick-film curability  Thickness 10 μm | ○ | ○ | ○ | ○ |
| Thickness 15 μm | Δ | Δ | Δ | Δ |

Example 3

An ink set in which the amount of a photopolymerization initiator was less than 10% by mass for a cyan ink and a yellow ink, less than 5% by mass for a magenta ink, and less than 12% by mass for a black ink, and the Irgacure 819/Irgacure TPO ratio exceeded 0.4 for the cyan ink, the yellow ink, and the black ink, and was less than 0.4 for the magenta ink showed a little reduction in thick-film curability, but had a good balance in curability across different colored inks, and was superior in thick-film curability. Table 5 shows the results.

TABLE 5

|  | Example 3 | | | |
|---|---|---|---|---|
|  | C-2 | M-3 | Y-2 | K-2 |
| Photopolymerization initiator (parts by mass) | 7.5 | 4.0 | 9.0 | 11.1 |
| Irgacure 819/Irgacure TPO (mass ratio) | 0.44 | 0.36 | 0.53 | 0.51 |
| Surface curability mJ/cm$^2$ | 120 | 120 | 120 | 120 |
| Balance in surface curability across different colored inks | | ○ | | |
| Thick-film curability  Thickness 10 μm | ○ | ○ | ○ | ○ |
| Thickness 15 μm | Δ | Δ | Δ | Δ |

Comparative Example 1

An ink set in which the amount of a photopolymerization initiator was less than 10% by mass for a cyan ink and a yellow ink, 5% by mass or more for a magenta ink, and less than 12% by mass for a black ink, and the Irgacure 819/Irgacure TPO ratio exceeded 0.4 for the cyan ink, the yellow ink, and the black ink, and was 0.4 to 0.8 for the magenta ink had high curability only in the magenta ink and lacked the balance in curability. Table 6 shows the results.

TABLE 6

|  | Comparative Example 1 | | | |
|---|---|---|---|---|
|  | C-1 | M-4 | Y-1 | K-1 |
| Photopolymerization initiator (parts by mass) | 7.5 | 7.0 | 9.0 | 11.1 |
| Irgacure 819/Irgacure TPO (mass ratio) | 0.30 | 0.50 | 0.33 | 0.27 |
| Surface curability mJ/cm$^2$ | 120 | 90 | 120 | 120 |
| Balance in surface curability across different colored inks | | x | | |
| Thick-film curability  Thickness 10 μm | ○ | Δ | ○ | ○ |
| Thickness 15 μm | ○ | x | ○ | ○ |

Comparative Example 2

An ink set in which the amount of a photopolymerization initiator was 10% by mass or more for a cyan ink and a yellow ink, 5% by mass or more for a magenta ink, and 12% by mass or more for a black ink, and the Irgacure 819/Irgacure TPO ratio was 0.1 to 0.4 for the cyan ink, the yellow ink, and the black ink, 0.4 to 0.8 for the magenta ink, which ink set had an amount of the photopolymerization initiator added in each ink exceeding the amount defined for each color in the present invention, was inferior in the thick-film curability. Table 7 shows the results.

TABLE 7

|  |  | Comparative Example 2 | | | |
| --- | --- | --- | --- | --- | --- |
|  |  | C-3 | M-4 | Y-3 | K-3 |
| Photopolymerization initiator (parts by mass) |  | 10.5 | 7.0 | 11.0 | 13.0 |
| Irgacure 819/Irgacure TPO (mass ratio) |  | 0.29 | 0.50 | 0.29 | 0.31 |
| Surface curability mJ/cm$^2$ |  | 90 | 90 | 90 | 90 |
| Balance in surface curability across different colors |  |  | ○ |  |  |
| Thick-film curability | Thickness 10 μm | Δ | Δ | Δ | Δ |
|  | Thickness 15 μm | x | x | x | x |

The invention claimed is:

1. An actinic-ray-curable ink set for ink-jet recording, comprising a cyan ink, a magenta ink, a yellow ink, and a black ink, the cyan ink comprising a phthalocyanine pigment, a radical polymerizable compound, and 3 to 10% by mass of a photopolymerization initiator based on the total amount of the cyan ink, wherein an acylphosphine oxide-based photopolymerization initiator in the photopolymerization initiator in the cyan ink comprises bis(2,4,6-trimethylbenzoyl)-phenylphosphine oxide and 2,4,6-trimethylbenzoyl-diphenyl-phosphine oxide at a mass ratio of 0.1 to 0.4;

the magenta ink comprising a quinacridone-based pigment, a radical polymerizable compound, and 1 to 5% by mass of a photopolymerization initiator based on the total amount of the magenta ink, wherein an acylphosphine oxide-based photopolymerization initiator in the photopolymerization initiator in the magenta ink comprises bis(2,4,6-trimethylbenzoyl)-phenylphosphine oxide and 2,4,6-trimethylbenzoyl-diphenyl-phosphine oxide at a mass ratio of 0.4 to 0.8;

the yellow ink comprising an azo pigment, a radical polymerizable compound, and 3 to 10% by mass of a photopolymerization initiator based on the total amount of the yellow ink, wherein an acylphosphine oxide-based photopolymerization initiator in the photopolymerization initiator in the yellow ink comprises bis(2,4,6-trimethylbenzoyl)-phenylphosphine oxide and 2,4,6-trimethylbenzoyl-diphenyl-phosphine oxide at a mass ratio of 0.1 to 0.4; and the black ink comprising a carbon black, a radical polymerizable compound, and 5 to 12% by mass of a photopolymerization initiator based on the total amount of the black ink, wherein an acylphosphine oxide-based photopolymerization initiator in the photopolymerization initiator in the black ink comprises bis(2,4,6-trimethylbenzoyl)-phenylphosphine oxide and 2,4,6-trimethylbenzoyl-diphenyl-phosphine oxide at a mass ratio of 0.1 to 0.4.

* * * * *